(12) United States Patent
Cho

(10) Patent No.: US 11,762,590 B2
(45) Date of Patent: *Sep. 19, 2023

(54) MEMORY SYSTEM AND DATA PROCESSING SYSTEM INCLUDING MULTI-CORE CONTROLLER FOR CLASSIFIED COMMANDS

(71) Applicant: SK hynix Inc., Icheon-si (KR)

(72) Inventor: Hung Yung Cho, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 75 days.

This patent is subject to a terminal disclaimer.

(21) Appl. No.: 17/401,994

(22) Filed: Aug. 13, 2021

(65) Prior Publication Data

US 2022/0083274 A1 Mar. 17, 2022

Related U.S. Application Data

(63) Continuation-in-part of application No. 17/238,935, filed on Apr. 23, 2021, now Pat. No. 11,662,947, and (Continued)

(30) Foreign Application Priority Data

Sep. 15, 2020 (KR) .................. 10-2020-0118428
Oct. 16, 2020 (KR) .................. 10-2020-0134059

(51) Int. Cl.
*G06F 3/06* (2006.01)

(52) U.S. Cl.
CPC ............ *G06F 3/0659* (2013.01); *G06F 3/064* (2013.01); *G06F 3/0604* (2013.01); (Continued)

(58) Field of Classification Search
CPC .... G06F 3/0659; G06F 3/0604; G06F 3/0679; G06F 3/0655; G06F 3/0611
See application file for complete search history.

(56) References Cited

U.S. PATENT DOCUMENTS

| 10,482,934 B2 | 11/2019 | Teh |
| 2012/0297135 A1 | 11/2012 | Mathew et al. |

(Continued)

FOREIGN PATENT DOCUMENTS

KR 20200114149 A 10/2020

OTHER PUBLICATIONS

Jung, M. et al., "Design of a Host Interface Logic for GC-Free SSDs." IEEE Transactions on Computer-Aided Design of Integrated Circuits and Systems, vol. 39, No. 8, Aug. 2020, 14 pages.

(Continued)

*Primary Examiner* — Tracy A Warren
(74) *Attorney, Agent, or Firm* — Perkins Coie LLP

(57) ABSTRACT

A controller for controlling a memory devices is provided to include: a first core configured to control first memory dies; a second core configured to control second memory dies; and a host interface configured to: receive submission queue tail pointers and command information on each of commands corresponding to the tail pointers from host, classify the commands into a first address command associated with a first logical address and a second address command associated with a second logical address based on the command information, fetch the first and second address commands from host, and provide the first address command to the first core and the second address command to the second core based on the processing order of the first and second address commands determined based on status of the first memory dies and the second memory dies.

20 Claims, 11 Drawing Sheets

Related U.S. Application Data a continuation-in-part of application No. 17/239,463, filed on Apr. 23, 2021, now Pat. No. 11,494,318.

(52) U.S. Cl.
CPC .......... *G06F 3/0631* (2013.01); *G06F 3/0656* (2013.01); *G06F 3/0679* (2013.01)

(56) References Cited

U.S. PATENT DOCUMENTS

| | | |
|---|---|---|
| 2015/0113305 A1* | 4/2015 | Shin ................. G06F 3/0679 713/323 |
| 2017/0060422 A1 | 3/2017 | Sharifie et al. |
| 2017/0286205 A1 | 10/2017 | Jeong et al. |
| 2018/0275921 A1 | 9/2018 | Katagiri et al. |
| 2018/0321987 A1 | 11/2018 | Benisty |
| 2021/0051455 A1 | 2/2021 | Panergo et al. |
| 2021/0089458 A1 | 3/2021 | Fruchter et al. |

OTHER PUBLICATIONS

Non-Final Office Action dated Mar. 3, 2022 in U.S. Appl. No. 17/239,463, pp. 19-31.
Notice of Allowance dated Jun. 27, 2022 in U.S. Appl. No. 17/239,463, pp. 13-18.

\* cited by examiner

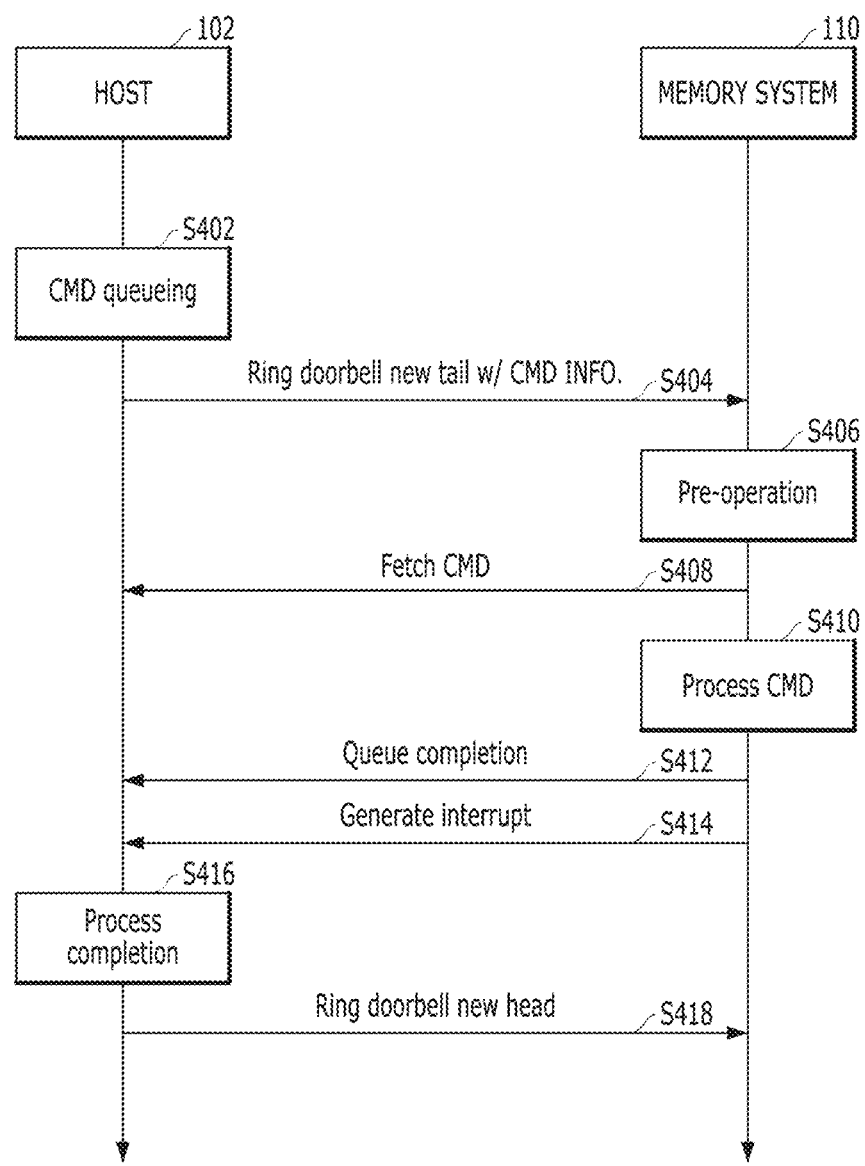

FIG. 8

|  |  | DIE STATUS | OPEN BLOCK OFFSET |
|---|---|---|---|
| CH1 | DIE11 | BUSY | 0 |
|  | DIE12 | BUSY | 0 |
|  | DIE13 | BUSY | 0 |
|  | DIE14 | BUSY | 0 |
| CH2 | DIE21 | BUSY | 10 |
|  | DIE22 | BUSY | 10 |
|  | DIE23 | BUSY | 10 |
|  | DIE24 | BUSY | 10 |
| CH3 | DIE31 | IDLE | 90 |
|  | DIE32 | IDLE | 90 |
|  | DIE33 | IDLE | 90 |
|  | DIE34 | IDLE | 90 |
| CH4 | DIE41 | IDLE | 50 |
|  | DIE42 | IDLE | 50 |
|  | DIE43 | IDLE | 50 |
|  | DIE44 | IDLE | 50 |

MEMORY SYSTEM AND DATA PROCESSING SYSTEM INCLUDING MULTI-CORE CONTROLLER FOR CLASSIFIED COMMANDS

CROSS-REFERENCE TO RELATED APPLICATION

This patent document is a continuation-in-part application of, and claims the benefits and priorities of the following two pending patent applications:
1. U.S. patent application Ser. No. 17/238,935 filed on Apr. 23, 2021, which claims priority to Korean patent application No. 10-2020-0118428 filed on Sep. 15, 2020
2. U.S. patent application Ser. No. 17/239,463 filed on Apr. 23, 2021, which claims priority to Korean patent application No. 10-2020-0134059 filed on Oct. 16, 2020.

The entire contents of the before-mentioned patent applications are incorporated herein by reference as a part of the disclosure of this application.

TECHNICAL FIELD

Various embodiments of the disclosed technology relate to a memory system and a data processing system including the memory system.

BACKGROUND

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

As memory systems do not need a mechanical driving part, the memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are directed to providing a memory system capable of performing a pre-operation for processing a command even before the command is fetched after a host rings a doorbell.

Various embodiments are directed to providing a memory system capable of reducing a processing time of the command by performing the pre-operation and successfully providing a response to the host.

The technical problems to be achieved by the present embodiment are not limited to the technical problems described above, and other technical problems may be inferred from the following embodiments.

In accordance with an embodiment, a controller for controlling memory devices is provided to include: a first core configured to control first memory dies in communication with the controller and store data associated with first logical addresses; a second core configured to control second memory dies in communication with the controller and store data associated with second logical addresses; and a host interface configured to: receive submission queue tail pointers and command information on each of commands corresponding to the tail pointers from host, classify the commands into a first address command associated with a first logical address and a second address command associated with a second logical address based on the command information, fetch the first and second address commands from host, and provide the first address command to the first core and the second address command to the second core based on the processing order of the first and second address commands determined based on status of the first memory dies and the second memory dies.

In accordance with an embodiment, an operation method of a controller including a first core and a second core that respectively control first memory dies and second memory dies is provided. The operation method includes: receiving submission queue tail pointers and command information on each of commands corresponding to the tail pointers from host; classifying the commands into a first address command associated with a first logical address and a second address command associated with a second logical address based on the command information; fetching the first and second address commands from the host; and providing the first address command to the first core and the second address command to the second core based on the processing order of the first and second address commands determined based on status of the first memory dies and the second memory dies.

Effects achievable in the present disclosure are not limited to the aforementioned effects and other unmentioned effects will be clearly understood by those skilled in the art from the following description.

BRIEF DESCRIPTION OF THE DRAWINGS

FIG. 4 is a diagram illustrating an operation of a data processing system in accordance with an embodiment of the disclosed technology.

FIG. 8 is a diagram for explaining examples of criteria determined in order for the host interface to perform command reordering based on some implementations of the disclosed technology.

DETAILED DESCRIPTION

Hereinafter, a preferred embodiment of the present disclosure will be described in detail with reference to the accompanying drawings. It is noted that in the following description, only parts necessary for understanding an operation in accordance with the present disclosure will be described and a description of parts other than the parts will be omitted in order not to obscure the subject matter of the present disclosure.

Figure 1:
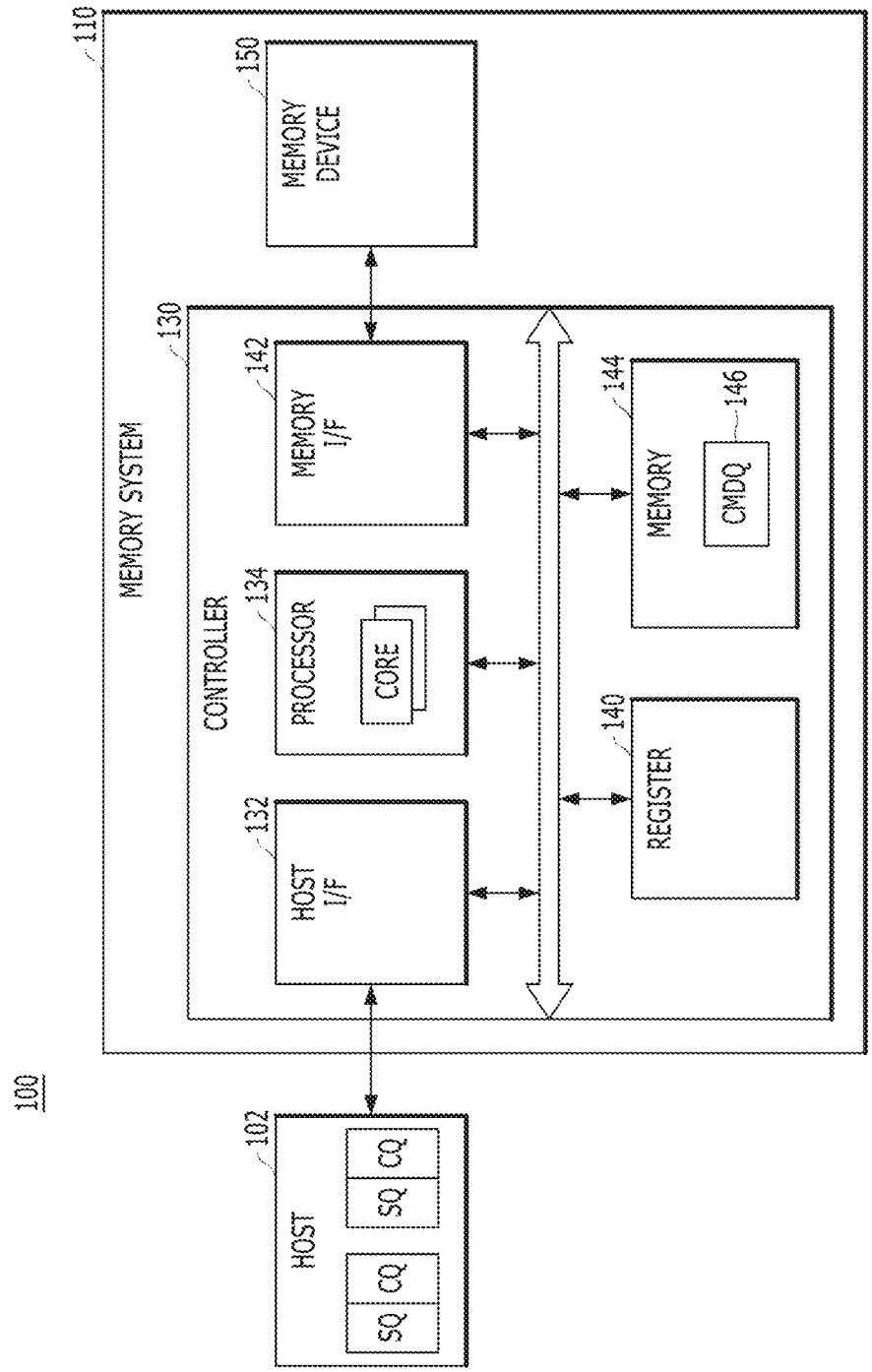
FIG. 1 is a diagram illustrating a data processing system in accordance with an embodiment of the disclosed technology.

FIG. 1 is a diagram schematically illustrating an example of a data processing system 100 including a memory system 110 in accordance with an embodiment of the disclosed technology.

Referring to FIG. 1, the data processing system 100 may include a host 102 operatively coupled to a memory system 110 in communication with the host 102.

The host 102 may include any of various portable electronic devices such as a mobile phone, MP3 player and laptop computer, or any of various non-portable electronic devices such as a desktop computer, a game machine, a television (TV), or a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request from the host 102. Non-limiting examples of the memory system 110 may include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC), micro-MMC, or others. The SD card may include a mini-SD card and/or micro-SD card.

The memory system 110 may be embodied as various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM), or a flash memory. The flash memory may have a 3-dimensional (3D) stack structure.

In an implementation, the memory system 110 may communicate with a host 102 by using a command queue interface that supports a protocol such as NVMe. The command queue interface may support an interface between the host 102 and the memory system 110 based on a queue pair including a submission queue SQ for inputting a requested command and a completion queue CQ for recording a processing result of the command.

Figure 2:
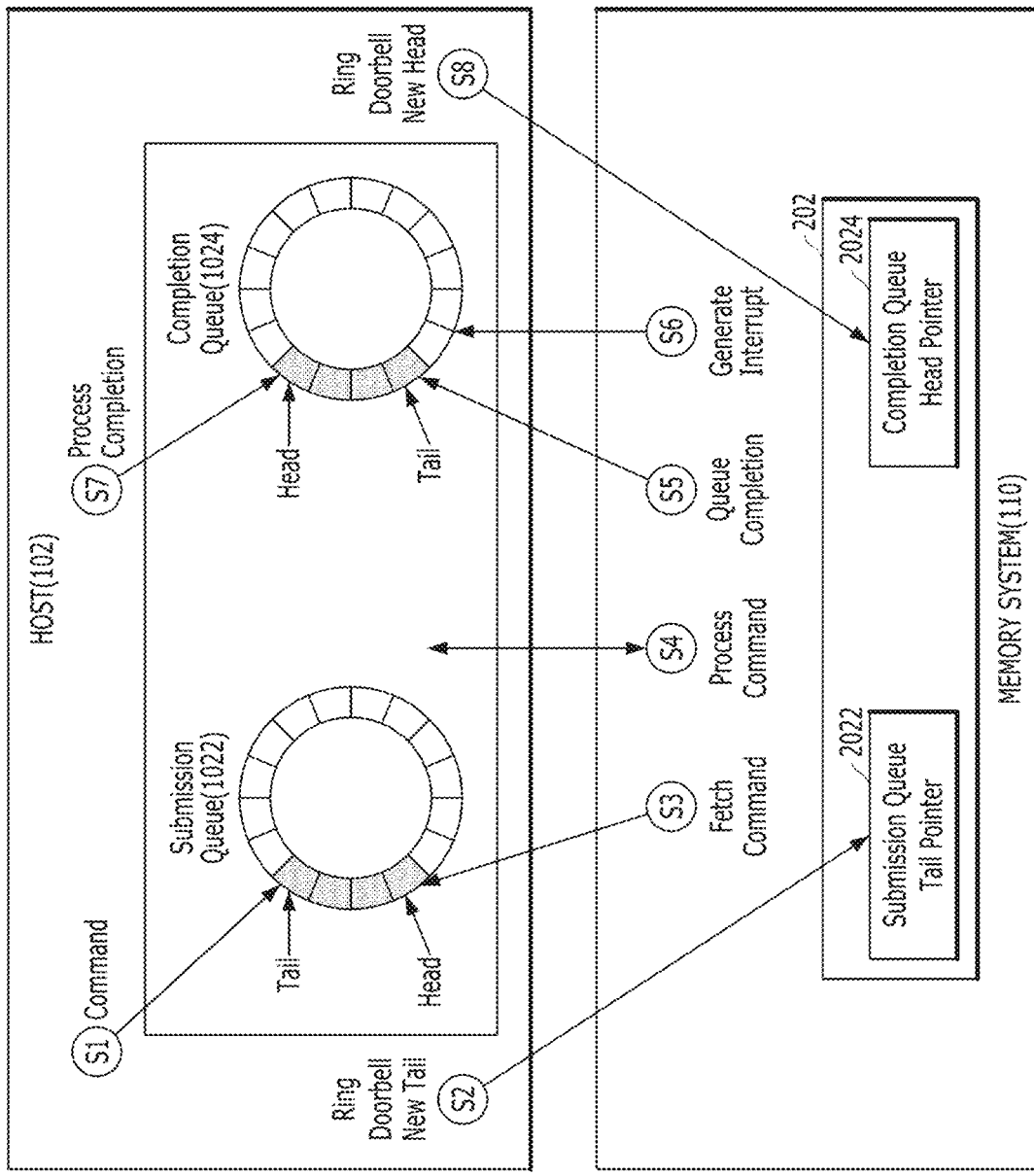
FIG. 2 is a diagram for explaining a command queue interface operation.

FIG. 2 is a diagram for explaining the command queue interface operation.

The host 102 may generate a queue pair including a submission queue 1022 and a completion queue 1024. When a plurality of cores exist in the host 102, the queue pair of the submission queue 1022 and the completion queue 1024 may be generated to correspond to one of the plurality of cores. In accordance with an embodiment, the queue pair may be stored in a memory of the host 102.

The memory system 110 may include a doorbell register 202 in order to perform the command queue interface operation. The memory system 100 communicates with the host 102 using a doorbell-based host interface which allows the host 102 putting descriptors on a memory ring for the memory system and issuing a pointer update write to the memory system 100, The pointer update write is referred to a "doorbell."

The doorbell register 202 may be a register for controlling the queue pair generated by the host 102. FIG. 2 illustrates one doorbell register 202 as an example, but when a plurality of cores exist in the host 102, the same number of doorbell registers 202 as the number of the cores may be included in the memory system 110. The doorbell register 202 may store a submission queue tail pointer 2022 indicating a tail of the submission queue 1022 and a completion queue head pointer 2024 indicating a head of the completion queue 1024. The memory system 110 may perform the command queue interface operation with the host 102 by accessing the submission queue 1022 and the completion queue 1024 with reference to the doorbell register 202.

In step S1, the host 102 may queue a command in the submission queue 1022 in order to request the memory system 110 to perform a command. In step S2, the host 102 may update the submission queue tail pointer 2022 and provide the updated submission queue tail pointer 2022 to the memory system 110. The memory system 110 may store the updated submission queue tail pointer 2022 in the doorbell register 202.

In step S3, the memory system 110 may fetch the command from the submission queue 1022. In step S4, the memory system 110 may process the fetched command.

In step S5, after the command has processed, the memory system 110 may record the completion of the command processing in the completion queue 1024. For example, the memory system 110 may write a completion queue entry in the completion queue 1024. In such a case, the completion queue head pointer 2024 may increase. In step S6, the memory system 110 may generate an interrupt signal.

In step S7, the host 102 may complete the command. In step S8, the host 102 may provide the updated completion queue head pointer 2024 to the memory system 110. For example, the memory system 110 may store the updated completion queue head pointer 2024 in the doorbell register 202.

Referring back to FIG. 1, the memory system 110 may include a memory device 150 and a controller 130. The memory device 150 may store data for the host 102, and the controller 130 may control the storage of the data into the memory device 150.

The controller 130 and the memory device 150 may be integrated into a single semiconductor device. For example, the controller 130 and the memory device 150 may be integrated as one semiconductor device to configure a solid state drive (SSD). When the memory system 110 is implemented as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks, each of which may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, a processor 134, a register 140, memory I/F 142, and a memory 144, which are electrically connected to each other to be operable or in communication via an internal bus.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI), or integrated drive electronics (IDE).

The host I/F 132 may be driven through firmware referred to as a host interface layer (HIL) in order to exchange data with the host 102.

The host I/F 132 may be a command queue interface as described with reference to FIG. 2, and may support interfacing between the host 102 and the memory system 110.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory devices.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations. For example, the memory 144 may include a command (CMD) queue 146 that queues commands fetched from the host 102.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

As described above, the memory 144 may store data required for performing a data write/read operation between the host 102 and the memory device 150 and data when the data write/read operation is performed. In order to store such data, the memory 144 may include a program memory, data memory, write buffer/cache, read buffer/cache, data buffer/cache, map buffer/cache or the like.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU). Particularly, in order to improve the data processing performance of the memory system 110, the processor 134 may be implemented as a multi-core processor including a plurality of cores.

The processor 134 may drive the FTL and perform a foreground operation corresponding to a request received from the host 102. For example, the processor 134 may control a write operation of the memory device 150 in response to a write request from the host 102 and control a read operation of the memory device 150 in response to a read request from the host 102.

Also, the processor 134 may perform a background operation onto the memory device 150. For example, the background operation performed onto the memory device 150 may include a garbage collection (GC) operation, a wear-leveling (WL) operation, a map flush operation, or a bad block management operation.

The register 140 may include the doorbell register 202. For example, the register 140 may include the same number of doorbell registers 202 as the number of cores of the host 102. As described with reference to FIG. 2, the doorbell register 202 may store data for performing the command queue interface operation.

For example, in which the register 140 is separated from the processor 134. However, in accordance with an embodiment, the register 140 may also be included in the processor 134.

In accordance with an embodiment of the disclosed technology, the doorbell register 202 may further store command information as well as the submission queue tail pointer 2022 and the completion queue head pointer 2024, which are described with reference to FIG. 2.

Figure 3:
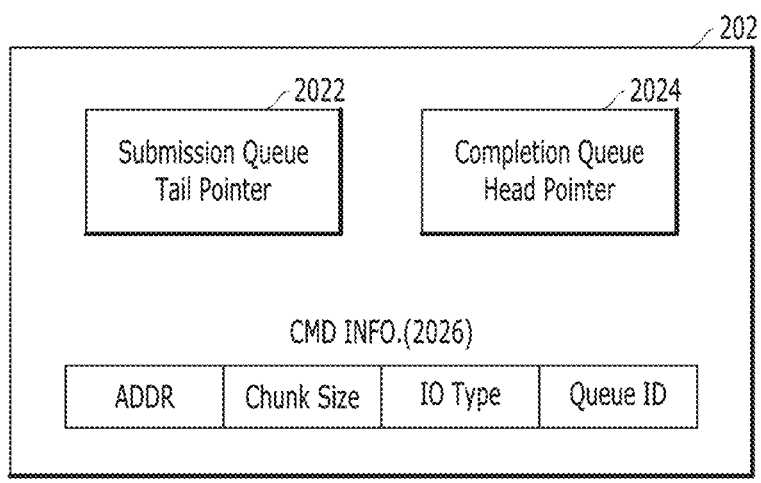
FIG. 3 is a diagram illustrating a doorbell register that further stores command information in accordance with an embodiment of the disclosed technology.

FIG. 3 illustrates the doorbell register 202 that further stores command information 2026 in addition to the submission queue tail pointer 2022 and the completion queue head pointer 2024 in accordance with an embodiment of the disclosed technology.

The host 102 may transmit the updated submission queue tail pointer 2022 to the memory system 110 together with the command information 2026 on a command corresponding to the submission queue tail pointer 2022. The command corresponding to the submission queue tail pointer 2022 refers to a command queued at a position indicated by the submission queue tail pointer 2022 in the submission queue 1022. The memory system 110 may store the updated submission queue tail pointer 2022 in the doorbell register 202 together with the command information 2026.

In accordance with an embodiment of the disclosed technology, the memory system 110 can acquire the command information 2026 on a command that has been queued in the submission queue 1022 of the host 102, but has not yet been fetched. Hereinafter, a command that has been queued in the submission queue 1022 of the host 102, but has not yet been fetched in the memory system 110 will be referred to as an unfetched command. The host I/F 132 may perform a pre-operation, such as allocating a buffer area for unfetched commands and determining an order in which the unfetched commands are queued in the command queue, based on the acquired command information 2026.

With the capabilities of the memory system 110 to perform the pre-operation on the unfetched command, the processing speed of the command can be improved. For example, the specification of the memory system 110 can require that a fail response is provided when commands from the host 102 are not processed within a predetermined processing time. The command processing time may be counted from when the doorbell rings, e.g., when the submission queue tail pointer 2022 indicating a position at which a corresponding command has been queued is stored in the doorbell register 202.

It may take a while until the doorbell corresponding to a certain command rings and then the command is fetched. If the memory system 110 can acquire command information only after fetching a command and interpreting the fetched command, any operation for the command being in an unfetched state is not performed by the memory system, which results in a waste of the predetermined processing time. Particularly, when the speed at which the submission queue tail pointer 2022 increases is faster than the speed at which the memory system 110 fetches a command, for the command queued relatively later in the submission queue, the time from when the doorbell rings and to when the command queued relatively later is fetched may be further increased. Accordingly, the memory system 110 may not process the command queued relatively later within the predetermined processing time and thus the memory system 110 ends up providing a fail response to the host 102.

In accordance with an embodiment of the disclosed technology, since the memory system 110 may perform a pre-operation on an unfetched command, it is possible to process the command without wasting the predetermined processing time. Accordingly, the memory system 110 can not only improve the processing speed of the command, but also provide a response desired by the host 102 by observing the predetermined processing time.

In accordance with an embodiment, the command information 2026 may store information on a command corresponding to the submission queue tail pointer 2022. In accordance with an embodiment, the command information 2026 may include start address information of a data chunk to be processed by the command, size information of the data chunk, input/output type information of the command, and identifier information on a queue in which the command has been queued. The start address information and the size information may be collectively referred to as address information. The input/output type of the command may be either a read type or a write type. The identifier information on a queue may indicate, when the host 102 includes a plurality of submission queues 1022, a submission queue 1022 in which the command has been queued.

In some implementations, even though the command information 2026 includes all of the start address information, the size information, the input/output type information, and the identifier information on a queue, the size of the command information 2026 may be only about several bytes to several tens of bytes. As the performance of the host I/F 132 is improved, the host 102 may provide the memory system 110 with several GB of data per second, for example. Accordingly, even though the host 102 provides the command information 2026 included in the doorbell register 202, it has almost no impact on the increase of the time required until the doorbell rings.

FIG. 4 is a diagram illustrating an operation of the data processing system 100 in accordance with an embodiment of the present disclosure.

In step S402, the host 102 may queue a command in the submission queue 1022 and update the submission queue tail pointer 2022.

In step S404, the host 102 may ring the doorbell through the host I/F 132. For example, the host 102 may store an updated submission queue tail pointer 2022 in the doorbell register 202, and store the command information 2026 on a command corresponding to the submission queue tail pointer 2022.

In step S406, the host I/F 132 may perform a pre-operation for processing the command based on the command information 2026. For example, as the pre-operation, the host I/F 132 may determine a processing order between unfetched commands and allocate a buffer area for the unfetched commands. The pre-operation in accordance with an embodiment of the present disclosure will be described in detail with reference to FIG. 5A to FIG. 5C.

In step S408, the host I/F 132 may fetch the command from the submission queue 1022. For example, the host I/F 132 may fetch the command by providing a memory read request to the host 102. The host I/F 132 may queue the fetched command in an internal command queue. The host I/F 132 may queue unfetched commands in the CMD queue 146 based on the processing order determined in step S406.

In step S410, the processor 134 may process the commands queued in the CMD queue 146. In a first example, the processor 134 may receive write data from the memory of the host 102 in order to process a write command, buffer the data into the buffer area allocated in step S406, and program the buffered data in the memory device 150. In a second example, the processor 134 may load data from the memory device 150 in order to process a read command, buffer the data into the allocated buffer area, and provide the buffered data to the host 102.

In step S412, the host I/F 132 may record the completion of the command processing in the completion queue 1024 after processing the command. For example, the host I/F 132 may write a completion queue entry in the completion queue 1024. In such a case, the completion queue head pointer 2024 may increase.

In step S414, the host I/F 132 may provide an interrupt signal to the host 102.

In step S416, the host 102 may complete the command.

In step S418, the host 102 may provide the updated completion queue head pointer 2024 to the memory system 110. The host I/F 132 may store the updated completion queue head pointer 2024 in the doorbell register 202.

Figure 5A:
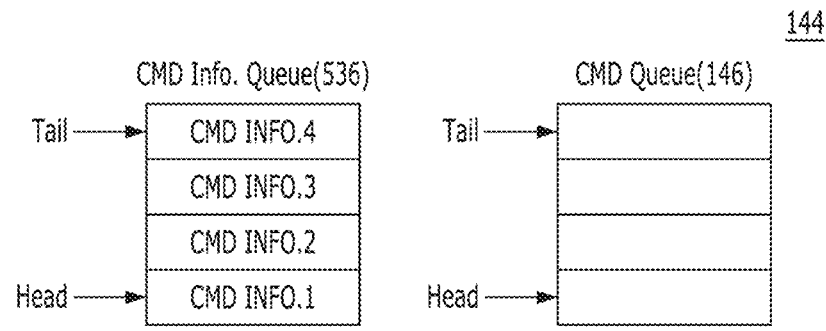
FIG. 5A to FIG. 5C are diagrams for explaining a pre-operation in accordance with an embodiment of the disclosed technology.
Figure 5B:
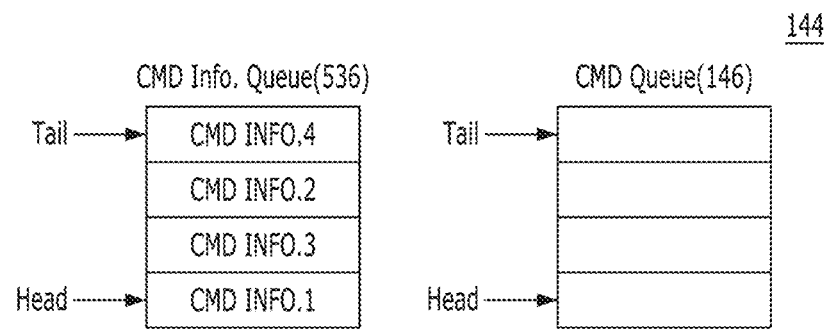
Figure 5C:
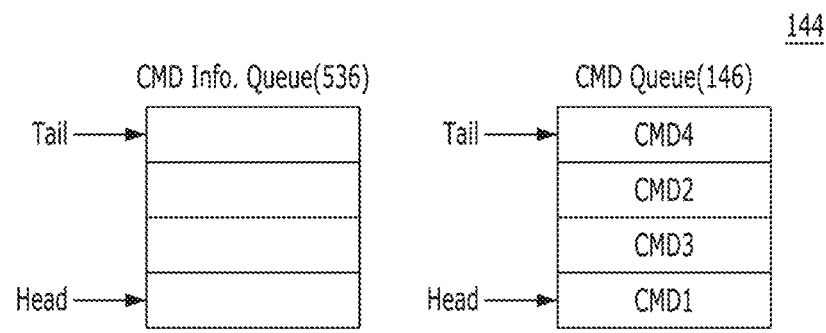

FIG. 5A to FIG. 5C are diagrams for explaining the pre-operation in accordance with an embodiment of the disclosed technology.

FIG. 5A to FIG. 5C illustrate the CMD queue 146 and a command information (CMD Info.) queue 536 that may be stored in the memory 144.

The CMD queue 146 may queue commands fetched from the host 102 as described with reference to FIG. 1. The CMD Info.queue 536 may queue command information on unfetched commands.

FIG. 5A illustrates a state in which no commands are queued in the CMD queue 146 and command information on unfetched commands are queued in the CMD Info.queue 536. For example, the host 102 may ring the doorbell in the order of first to fourth commands. The host I/F 132 may queue first to fourth command information, which correspond to the first to fourth commands, respectively, in the CMD Info.queue 536 in the order in which the doorbell rings.

The host I/F 132 may perform a pre-operation on the unfetched commands based on the command information 2026 on the unfetched commands.

In a first example of the pre-operation, the host I/F 132 may determine an order, in which the unfetched commands are processed, based on address information included in the command information 2026 on the unfetched commands.

In a second example of the pre-operation, the host I/F 132 may allocate a buffer area for the unfetched commands to the memory 144 based on the address information. For example, the host I/F 132 may determine the size of the buffer area to be allocated by referring to size information of a data chunk of the unfetched commands.

FIG. 5B illustrates that the order, in which the unfetched commands are processed, is changed by the host I/F 132.

For example, when an address of a first data chunk to be processed by the first command and an address of a third data chunk to be processed by the third command are continuous with each other, the host I/F 132 may change the processing order of the second command and the third command such that the first command and the third command may be continuously processed.

When queuing commands fetched from the submission queue 1022 in the CMD queue 146, the host I/F 132 may queue the commands in the order determined by the CMD Info.queue 536. For example, the host I/F 132 may fetch unfetched commands in an order in which they have been queued in the submission queue 1022, but when queuing the fetched commands in the CMD queue 146, the host I/F 132 may adjust an order between the commands queued in the CMD queue 146 by referring to the order determined by the CMD Info.queue 536.

FIG. 5C illustrates that the fetched commands are queued in the CMD queue 146 according to the changed order. For example, the CMD queue 146 may queue the first to fourth commands in the order of the first command, the third command, the second command, and the fourth command in the same order as the command processing order determined in FIG. 5B.

In accordance with an embodiment of the disclosed technology, when the host 102 rings the doorbell, the host I/F 132 may receive the command information 2026 as well as the submission queue tail pointer 2022. The host I/F 132 may perform a pre-operation on unfetched commands by using the command information 2026. For example, the pre-operation may include a buffer allocation operation for the unfetched commands and an operation of determining the processing order of the unfetched commands. After fetching the unfetched commands, the host I/F 132 may process the fetched commands based on the result of the pre-operation.

When performing the pre-operation on the unfetched commands, the host I/F 132 may skip performing the buffer allocation operation after fetching the commands. Therefore, the processing time of the fetched commands can be shortened. Furthermore, the host I/F 132 may process commands based on a processing order determined before the commands are fetched. Therefore, it is possible to efficiently process the commands.

The plurality of cores included in the processor 134 may operate in parallel to improve the data processing performance of the memory system 110. The parallel operation of the plurality of cores will be described in detail with reference to FIG. 6.

Figure 6:
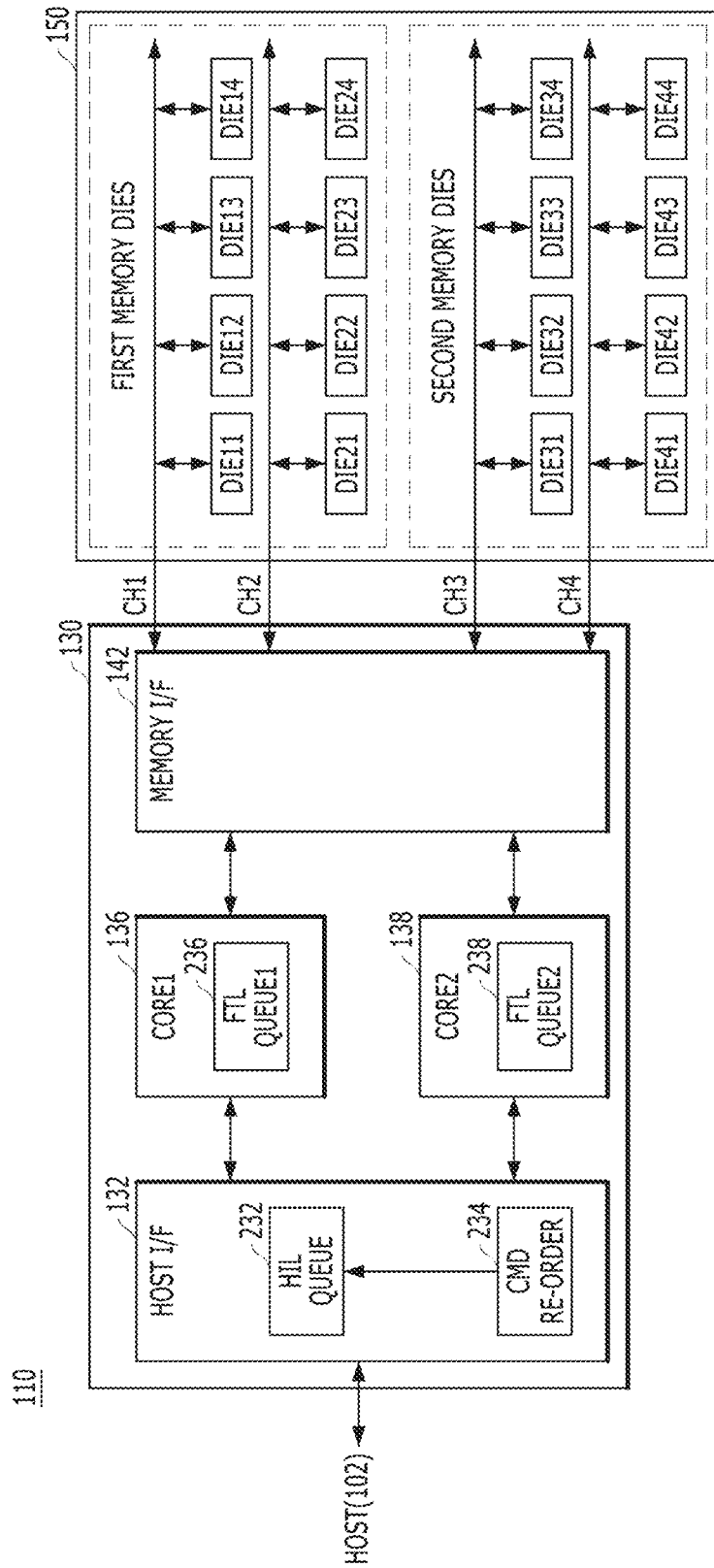
FIG. 6 is a detailed block diagram of the memory system illustrated in FIG. 1.

FIG. 6 is a detailed block diagram of the memory system 110 illustrated in FIG. 1.

The memory device 150 described with reference to FIG. 1 may include a plurality of first memory dies DIE11 to DIE14 and DIE21 to DIE24, and a plurality of second memory dies DIE31 to DIE34 and DIE41 to DIE44 illustrated in FIG. 6. The plurality of memory dies DIE11 to DIE14, DIE21 to DIE24, DIE31 to DIE34, and DIE41 to DIE44 may be connected to the memory I/F 142 through a plurality of channels CH1 to CH4, respectively.

Each of the plurality of memory dies DIE11 to DIE14, DIE21 to DIE24, DIE31 to DIE34, and DIE41 to DIE44 may have a hierarchical structure of a memory die, a plane, a memory block, and a page. One memory die may receive one command through a channel at one time. One memory die may include one or more planes, and the planes may process the commands received by the memory die in parallel. Each of the planes may include a plurality of memory blocks. The memory block may be a minimum unit of an erase operation. One memory block may include a plurality of pages. The page may be a minimum unit of a program operation and a read operation.

The structures of the plurality of memory dies DIE11 to DIE14, DIE21 to DIE24, DIE31 to DIE34, and DIE41 to DIE44 may be substantially the same as or similar to one another. The plurality of memory dies DIE11 to DIE14, DIE21 to DIE24, DIE31 to DIE34, and DIE41 to DIE44 may operate independently.

The controller 130 described with reference to FIG. 1 may correspond to the controller 130 illustrated in FIG. 6. Some of the components of the controller 130 described with reference to FIG. 1 are omitted from FIG. 6. The first and second cores 136 and 138 illustrated in FIG. 6 may correspond to the plurality of cores included in the processor 134 of FIG. 1. The first and second cores 136 and 138 may operate independently.

The first and second cores 136 and 138 and the plurality of memory dies DIE11 to DIE14, DIE21 to DIE24, DIE31 to DIE34, and DIE41 to DIE44 may be configured to operate in parallel such that the memory system 110 may provide high data processing performance.

The first and second cores 136 and 138 may process commands associated with different addresses. For example, the first core 136 may process only commands associated with odd logical addresses, and the second core 138 may process only commands associated with even logical addresses. Hereinafter, the commands associated with the odd logical addresses are referred to as odd address commands and the commands associated with the even logical addresses are referred to as even address commands.

The embodiment of the present disclosure will be described using, as an example, a case where two cores process the even address commands and the odd address commands, respectively. However, the present disclosure is not limited thereto. For example, the processor 134 may include two or more cores, and the host I/F 132 may provide a command to each core based on the modulo operation dividing logical addresses associated with commands from the host 102 by the number of cores.

The host I/F 132 may detect the value of the doorbell register 202 and fetch commands queued in the submission queue 1022 of the host 102. The host I/F 132 may first queue the fetched commands in an HIL queue 232. Then, the host I/F 132 may provide the commands to the first core 136 or the second core 138 according to whether logical addresses of the queued commands are odd logical addresses or even logical addresses.

The first and second cores 136 and 138 may control memory dies exclusively allocated thereto. For example, the first core 136 may control only the memory dies DIE11 to DIE14 and DIE21 to DIE24 connected through the first and second channels CH1 and CH2, respectively, and the second core 138 may control only the memory dies DIE31 to DIE34 and DIE41 to DIE44 connected through the third and fourth channels CH3 and CH4, respectively. Hereinafter, the memory dies DIE11 to DIE14 and DIE21 to DIE24 controlled by the first core 136 are referred to as first memory dies, and the memory dies DIE31 to DIE34 and DIE41 to DIE44 controlled by the second core 138 are referred to as second memory dies.

The first core 136 may receive odd address commands, queue the odd address commands in a first FTL queue 236, and then map the odd address commands to physical addresses of the first memory dies. The second core 138 may receive even address commands, queue the even address commands in a second FTL queue 238, and then map the even address commands to physical addresses of the second memory dies. Since the first and second cores 136 and 138 process commands associated with different logical addresses and physical addresses, they may operate in parallel without interfering with each other.

The first core 136 may reorder a command execution order of the odd address commands queued in the first FTL queue 236. Such reordering may be performed to improve data processing performance in consideration of an interleave program or others. Similarly, the second core 138 may also reorder a command execution order of the even address commands queued in the second FTL queue 238.

Since the first and second cores 136 and 138 do not interfere with each other, there was limitations in the conventional technologies that a command execution order cannot be reordered between the even address commands and the odd address commands after the commands queued in the HIL queue 232 are queued in the first and second FTL queues 236 and 238.

In accordance with the embodiment of the present disclosure, the host I/F 132 may change a processing order of the commands queued in the HIL queue 232, and provide the commands to the first and second FTL queues 236 and 238 in the changed order. For example, the host I/F 132 may change the command processing order between the even address commands and the odd address commands on the basis of the statuses of the first and second memory dies. In accordance with the embodiment of the present disclosure, the HIL queue 232 may determine the command processing order in consideration of all the statuses of the first and second memory dies, thereby compensating for a limitation in the command reordering of the first and second cores 136 and 138 that was caused due to the first and second cores not interfere with each other.

Hereinafter, the command reordering method of the host I/F 132 in accordance with the embodiment of the present disclosure will be described in detail.

Figure 7A:
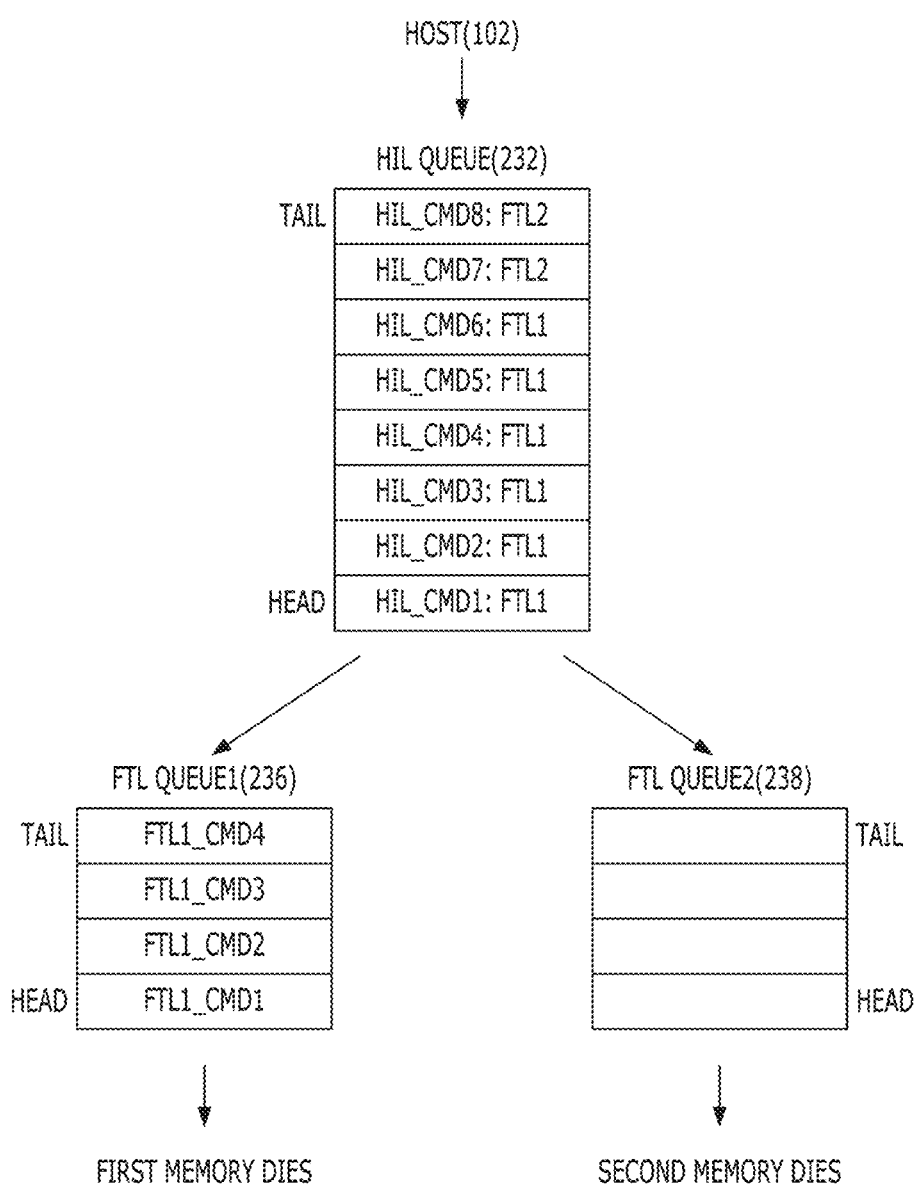
FIG. 7A to FIG. 7C are diagrams for explaining a command reordering operation of a host interface based on some implementations of the disclosed technology.
Figure 7B:
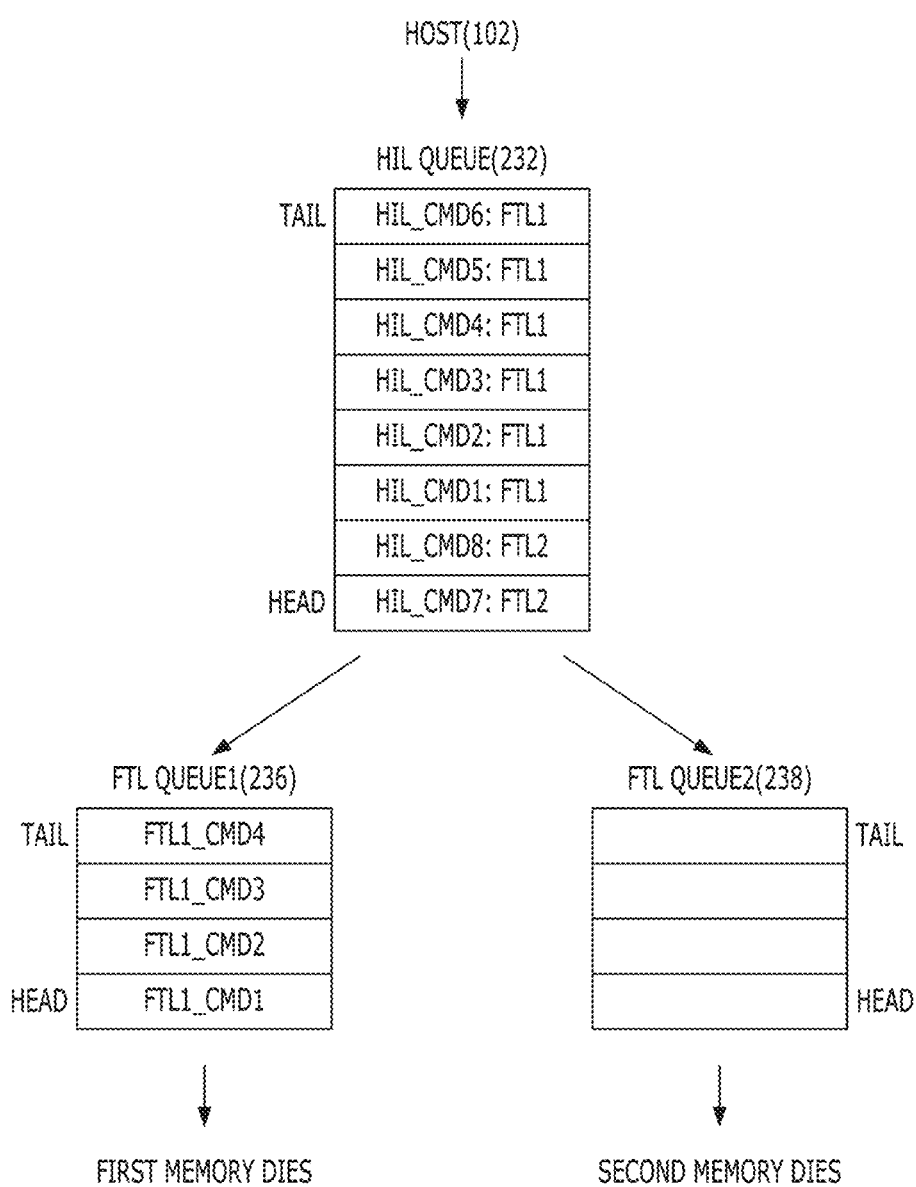
Figure 7C:
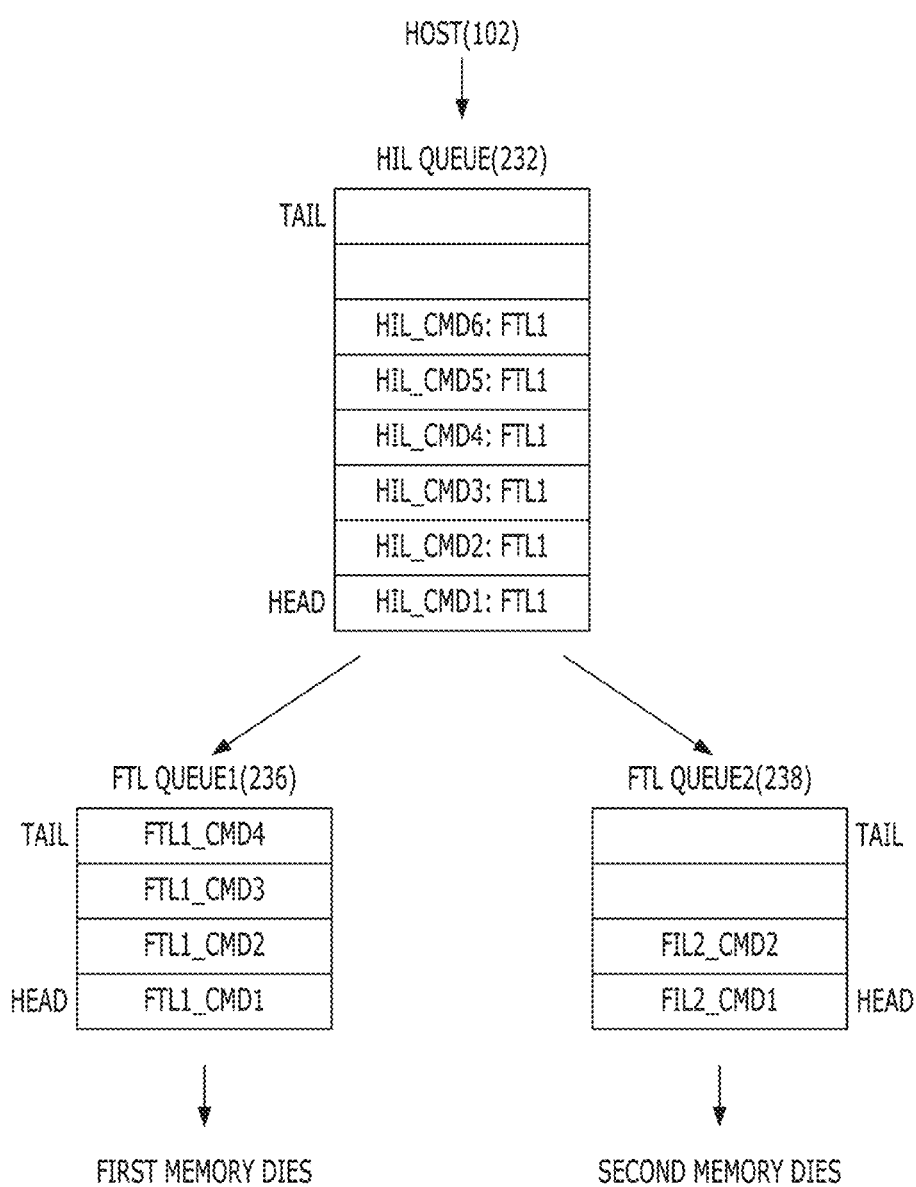

FIG. 7A to FIG. 7C are diagrams for explaining the command reordering of the host I/F 132. FIG. 7A to FIG. 7C illustrate the HIL queue 232, the first FTL queue 236, and the second FTL queue 238, and also illustrate the head HEAD and the tail TAIL of each queue.

FIG. 7A is a diagram for explaining the statuses of queues before the command reordering is performed in accordance with the embodiment of the present disclosure.

FIG. 7A illustrates a state in which commands are queued in all entries of the first FTL queue 236 and no commands are queued in the second FTL queue 238. In the state, the host I/F 132 may receive a plurality of commands and queue the commands in the HIL queue 232. In the example of FIG. 7A, the HIL queue 232 may receive eight commands. Among the eight commands, first to sixth commands HIL_CMD1 to HIL_CMD6 received first may be commands to be provided as odd address commands to the first core 136, and seventh and eighth commands HIL_CMD7 and HIL_CMD8 received later may be commands to be queued as even address commands in the second core 138.

When the host I/F 132 does not perform the command reordering of the commands queued in the HIL queue 232 and provides the commands to the first and second cores 136 and 138 without the command reordering, the even address commands, i.e., the seventh and eighth commands HIL_CMD7 and HIL_CMD8, may not be provided to the second core 138 until the first to sixth commands HIL_CMD1 to HIL_CMD6 are provided to the first core 136.

When the commands are queued in all the entries of the first FTL queue 236, the first to sixth commands HIL_CMD1 to HIL_CMD6 may not be queued in the first FTL queue 236 until the commands are queued the first FTL queue 236 are processed. Thus, even when the second FTL queue 238 is empty and the second core 138 may be in the state that is able to immediately process commands, since the host I/F 132 is allowed to provide the seventh and eighth commands HIL_CMD7 and HIL_CMD8 to the second FTL queue 238 only after waiting until all the first to sixth commands HIL_CMD1 to HIL_CMD6 are queued in the first FTL queue 236, the parallel operation of the first and second cores 136 and 138 cannot be performed as desired.

When the parallel operation of the first and second cores 136 and 138 is limited, the data processing performance of the memory system 110 is also limited.

In accordance with the embodiment of the present disclosure, the host I/F 132 may perform command reordering of the commands queued in the HIL queue 232.

FIG. 7B is a diagram for explaining the command reordering in accordance with the embodiment of the present disclosure.

The host I/F 132 may queue commands received from the host 102 in the HIL queue 232, and reorder the queued commands when a predetermined condition is satisfied.

As a first example of the predetermined condition, when commands are queued in all the entries of the HIL queue 232, the host I/F 132 may reorder commands queued in the HIL queue 232.

As a second example of the predetermined condition, on the basis of logical addresses of the commands queued in the HIL queue 232, when it is determined that the first and second cores 136 and 138 may operate at the same time, the host I/F 132 may reorder the commands queued in the HIL queue 232. For example, when a data size associated with the odd address commands queued in the HIL queue 232 and a data size associated with the even address commands queued in the HIL queue 232 are both equal to or more than a predetermined size, the host I/F 132 may reorder the commands queued in the HIL queue 232. When the data size associated with the odd address commands and the data size associated with the even address commands are both equal to or more than the predetermined size, if the host I/F 132 performs the command reordering and provides commands to the first and second cores 136 and 138, the first and second cores 136 and 138 may perform a foreground operation at the same time.

As a third example of the predetermined condition, when the value of the submission queue tail pointer 2022 of the doorbell register 202 is not changed for a predetermined period or more from the time when a command finally queued in the HIL queue 232 has been fetched, the host I/F 132 may reorder the commands queued in the HIL queue 232. Thus, in order to substantially prevent delay in command processing, when a new command is not received for a predetermined period or more from the time when the last command has been received even though the predetermined conditions of the first and second examples are not satisfied, the host I/F 132 may reorder the commands queued in the HIL queue 232.

In the example of FIG. 7B, the host I/F 132 may detect that commands have been queued in all the entries of the HIL queue 232 and perform command reordering.

The host I/F 132 may perform the command reordering according to predetermined criteria. For example, the host I/F 132 may perform the command reordering such that a command is first provided to a core including memory dies in an idle state. In the example of FIG. 7B, since the second FTL queue 238 is empty, the second memory dies associated with the second core 138 may also be in an idle state. The host I/F 132 may adjust an order of commands such that the seventh and eighth commands HIL_CMD7 and HIL_CMD8 are provided before the first to sixth commands HIL_CMD1 to HIL_CMD6.

FIG. 7C is a diagram for explaining effects that occur when the command reordering in accordance with the embodiment of the present disclosure has been performed.

The host I/F 132 may provide the second FTL queue 238 with the seventh and eighth commands HIL_CMD7 and HIL_CMD8 without waiting until commands queued in the first FTL queue 236 are completely processed. The second core 138 may not wait in an idle state, and may process the commands simultaneously with the first core 136. The second memory dies controlled by the second core 138 may also perform an operation simultaneously with the first memory dies without waiting in an idle state. Accordingly, in accordance with the embodiment of the present disclosure, the parallel operation of the first and second cores 136 and 138 can be performed as desired and the throughput of the memory system 110 can be improved.

The criteria determined in order for the host I/F 132 to perform the command reordering are not limited to those described in FIG. 7B. Various examples of the predetermined criteria will be described in detail with reference to FIG. 8.

FIG. 8 is a diagram for explaining examples of the criteria determined for the host I/F 132 to perform the command reordering.

FIG. 8 illustrates a table including die statuses and open block offsets for each of the plurality of the memory dies DIE11 to DIE14, DIE21 to DIE24, DIE31 to DIE34, and DIE41 to DIE44 included in the plurality of channels CH1 to CH4, respectively. The die status is displayed as BUSY when a corresponding memory die is in operation and is displayed as IDLE when the corresponding memory die is not in operation. The open block offset refers to a page offset indicating an order of a page to be programmed in an open block among memory blocks included in each memory die. In the example of FIG. 8, each memory block may include 100 pages. The open block is a memory block currently allocated in order to perform a program operation among the memory blocks of the memory die, and may refer to a memory block in which none of the 100 pages is programmed.

FIG. 8 illustrates a case where memory dies included in one channel have substantially the same die statuses and open block offsets. For example, the first and second cores 136 and 138 may group the memory blocks of the aforementioned memory dies and treat the grouped memory blocks as a super block in order to improve the parallelism of memory dies included in one channel. When one super block is accessed, memory dies included in one channel may have substantially the same die statuses and open block offsets. However, the present disclosure is not limited to the case where memory dies included in one channel have substantially the same die statuses and open block offsets.

As a first example of the predetermined criteria, where there is a memory die in an idle state among the plurality of memory dies DIE11 to DIE14, DIE21 to DIE24, DIE31 to DIE34, and DIE41 to DIE44, the host I/F 132 may perform the command reordering such that a command associated with a core that controls a corresponding memory die is first provided. In the example of FIG. 8, the host I/F 132 may perform the command reordering of the commands of the HIL queue 232 such that an even address command associated with the second core 138 that controls the plurality of memory dies DIE31 to DIE34 and DIE41 to DIE44 in an idle state is first provided.

When the memory dies DIE11 to DIE14, DIE21 to DIE24, DIE31 to DIE34, and DIE41 to DIE44 are all in a busy state, the host I/F 132 may perform the command reordering by interleaving the odd address commands and the even address commands included in the HIL queue 232. Specifically, the host I/F 132 may perform the command reordering such that odd address commands and even address commands for processing data each having a predetermined size are alternately provided. For example, the host I/F 132 may perform the command reordering such that an odd address command for 96 KB data and an even address command for 96 KB data are alternately provided.

For example, the predetermined size may be a data size that can be processed at one time when memory dies controlled by one core operate at the same time. Specifically, the predetermined size may be determined on the basis of the number of memory dies controlled by one core and a page size of each memory die.

As a second example of the predetermined criteria, the host I/F 132 may perform the command reordering such that a command is first provided to a core that controls a memory die having the largest free space in an open block thereof among the plurality of memory dies DIE11 to DIE14, DIE21 to DIE24, DIE31 to DIE34, and DIE41 to DIE44. In the example of FIG. 8, as the open block offset is closer to '0', a free space in a corresponding open block may be large, and as the open block offset is closer to '100', the free space in the corresponding open block may be small.

When all pages of a memory block used as an open block are programmed, the first and second cores 136 and 138 may determine the memory block as a closed block, and determine one of free blocks, which are memory blocks in an erase state, as an open block. When one of the free blocks is determined as an open block, the number of free blocks of a memory die may be reduced. In order to recover the reduced number of free blocks, the first and second cores 136 and 138 may perform a background operation such as garbage collection, but foreground operation performance may be delayed by the background operation.

When a program command is first processed in a memory die having a relatively small free space in an open block thereof, the background operation of the memory system 110 may be performed after a relatively small amount of data is programmed. For example, when the second core 138 first performs a program operation on the memory dies DIE31 to DIE34 connected to the third channel CH3, 10 pages of data may be programmed for each memory die, and then the background operation may be started in the second core 138. When the background operation is started in the second core 138, the throughput of the second core 138 may be reduced. When the throughput of the second core 138 is reduced, the average throughput of the memory system 110 may be reduced.

When a command is first processed in a memory die having the largest free space in an open block thereof, the background operation of the memory system 110 may be performed after a large amount of data is programmed. For example, when the first core 136 first performs a program operation on the memory dies DIE11 to DIE14 connected to the first channel CH1, 100 pages of data may be programmed for each memory die, and then the background operation may be started in the first core 136.

Accordingly, the host I/F 132 may perform the command reordering such that an odd address command associated with the first core 136 that controls the memory dies DIE11 to DIE14 each having the largest free space in an open block thereof is first processed.

FIG. 8 illustrates that the die statuses and open block offsets of the plurality of the memory dies DIE11 to DIE14, DIE21 to DIE24, DIE31 to DIE34, and DIE41 to DIE44 are included in one table; however, the present disclosure is not limited thereto. For example, the host I/F 132 may acquire the die statuses of the plurality of the memory dies DIE11 to DIE14, DIE21 to DIE24, DIE31 to DIE34, and DIE41 to DIE44 by accessing the register of the memory I/F 142, and acquire the open block offsets from map data of the first and second cores 136 and 138.

Figure 9:
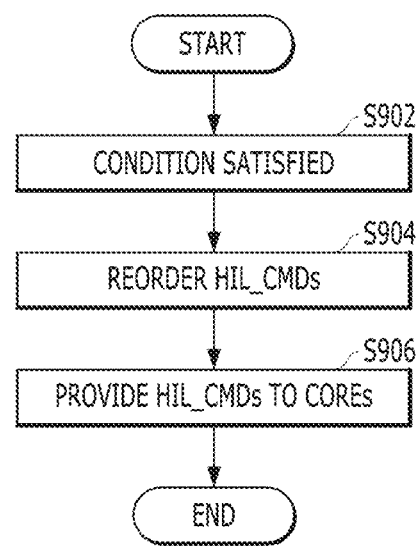
FIG. 9 is a diagram illustrating an operation of the host interface in accordance with an embodiment of the disclosed technology.

FIG. 9 is a diagram illustrating the operation of the host I/F 132 in accordance with the embodiment of the present disclosure.

In step S902, the host I/F 132 may determine whether a predetermined condition has been satisfied in order to perform the command reordering. An example of the predetermined condition has been described in detail with reference to FIG. 4*b*.

In step S904, the host I/F 132 may perform the command reordering of the commands HIL_CMDs queued in the HIL queue 232, according to the predetermined criteria. An example of the predetermined criteria has been described in detail with reference to FIG. 7B and FIG. 8.

In step S906, the host I/F 132 may provide the commands HIL_CMDs queued in the HIL queue 232 to the first and second cores 136 and 138 in an order in which the commands HIL_CMDs have been reordered.

In accordance with the embodiment of the present disclosure, the host I/F 132 may perform the command reordering between commands queued in the HIL queue 232 and associated with different cores, and provide the commands queued in the HIL queue 232 to the first and second cores 136 and 138 in an order determined by the command reordering. The host I/F 132 performs the command reordering, so that it is possible to substantially prevent congestion of the HIL queue 232 due to congestion of the first or second FTL queue 236 and 238, and to improve the parallelism of the first and second cores 136 and 138. Accordingly, the performance of the memory system 110 can be improved.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is:

1. A controller for controlling first memory dies and second memory dies, comprising:
   a first core configured to control the first memory dies coupled to the controller via a first channel to store data associated with first logical addresses in the first memory dies;
   a second core configured to control the second memory dies coupled to the controller via a second channel to store data associated with second logical addresses in the second memory dies, the second channel being different from the first channel; and
   a host interface configured to:
   receive submission queue tail pointers from a host, fetch commands and command information on each of the commands corresponding to the submission queue tail pointers from the host, classify the commands into a first address command associated with a first logical address corresponding to the first core and a second address command associated with a second logical address corresponding to the second core based on the command information, and provide the first address command to the first core and the second address command to the second core based on a processing order of the first and second address commands determined based on status of the first memory dies and the second memory dies.

2. The controller of claim 1, wherein the host interface fetches the first and second commands according to the processing order, and is further configured to provide completion responses to the host in response to completion of processing the fetching of the first and second address commands.

3. The controller of claim 1, wherein the command information includes at least one of address information, command type information, or submission queue identifier information.

4. The controller of claim 1, wherein the address information includes at least one of start address information of a data chunks to be processed by the first and second commands, or size information of the data chunks.

5. The controller of claim 4, wherein the host interface is further configured to allocate buffer areas in the controller for the first and second commands based on the size information of the data chunks before fetching the first and second address commands.

6. The controller of claim 1, wherein when one of the first memory dies is in an idle state, the host interface is configured to determine the processing order such that the first address command is provided to the first core before the second address command is provided to the second core.

7. The controller of claim 1, wherein when the first memory dies and the second memory dies are in a busy state, the host interface is configured to determine the processing order by interleaving the first and second address commands.

8. The controller of claim 7, wherein the host interface is configured to interleave the first and second address commands such that the first and second address commands are alternatively provided, each of the first and second address commands having a predetermined size.

9. The controller of claim 8, wherein the predetermined size is based on the number of memory dies controlled by the first core or the second core and a page size of each memory die.

10. The controller of claim 1, wherein the host interface is configured to determine the processing order such that the first address command is provided to the first core before the second address command is provided to the second core, the first core is configured to control a memory die having the largest free space in an open block thereof.

11. The controller of claim 1, wherein the host interface is configured to determine the processing order when fetched commands are queued in all entries of a command queue included in the host interface.

12. The controller of claim 1, wherein the host interface is configured to determine the processing order when a data size associated with the first and second address command are both equal to or more than a predetermined size.

13. The controller of claim 1, wherein the host interface is configured to determine the processing order when a new tail pointer is not received for at least a predetermined period from when a last tail pointer has been received from the host.

14. The controller of claim 1, wherein the host interface is configured to classify the commands into the first and second address command based on a modulo operation result of logical addresses associated with the commands.

15. An operation method of a controller including a first core and a second core, wherein the first core and the second core are configured to control first memory dies and second memory dies, respectively, the first memory dies and the second memory dies coupled to the controller via different channels, and the operation method comprising:

receiving submission queue tail pointers from a host;

fetching command and command information on each of the commands corresponding to the submission queue tail pointers from the host;

classifying the commands into a first address command associated with a first logical address and a second address command associated with a second logical address based on the command information; and providing the first address command to the first core and the second address command to the second core based on a processing order of the first and second address commands determined based on status of the first memory dies and the second memory dies.

16. The operation method of claim 15, the fetching the first and second address commands is according to the processing order, and the operation method further comprising:

providing completion responses to the host in response to completion of processing the fetching of the first and second address commands.

17. The operation method of claim 16, wherein the command information includes at least one of start address information of a data chunks to be processed by the first and second commands, or size information of the data chunks.

18. The operation method of claim 17, further comprising:

allocating buffer areas in the controller for the first and second commands based on the size information of the data chunks before fetching the first and second address commands.

19. The operation method of claim 15, wherein the determining of the processing order includes:

when one or the first memory dies is in an idle state, determining the processing order such that the first address command is provided to the first core before the second address command is provided to the second core.

20. The operation method of claim 15, wherein the determining of the processing order includes:

when the first memory dies and the second memory dies are in a busy state, interleaving the first and second address commands.

* * * * *